United States Patent
Fukuma et al.

(10) Patent No.: US 11,169,609 B2
(45) Date of Patent: Nov. 9, 2021

(54) INFORMATION PROCESSING APPARATUS, INFORMATION PROCESSING METHOD, AND PROGRAM

(71) Applicant: SONY CORPORATION, Tokyo (JP)

(72) Inventors: Yohei Fukuma, Chiba (JP); Osamu Ito, Tokyo (JP); Ikuo Yamano, Tokyo (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/976,160

(22) PCT Filed: Jan. 16, 2019

(86) PCT No.: PCT/JP2019/000983
§ 371 (c)(1),
(2) Date: Aug. 27, 2020

(87) PCT Pub. No.: WO2019/171767
PCT Pub. Date: Sep. 12, 2019

(65) Prior Publication Data
US 2020/0409462 A1    Dec. 31, 2020

(30) Foreign Application Priority Data
Mar. 7, 2018 (JP) .............................. JP2018-040349

(51) Int. Cl.
*G06F 3/01* (2006.01)
*H04R 5/02* (2006.01)
*H04R 5/04* (2006.01)
*H04S 7/00* (2006.01)

(52) U.S. Cl.
CPC ............... *G06F 3/016* (2013.01); *H04R 5/02* (2013.01); *H04R 5/04* (2013.01); *H04S 7/302* (2013.01)

(58) Field of Classification Search
CPC . G06F 3/016; G06F 3/16; G06F 3/165; G08B 6/00; A63F 13/28; A63F 13/285; A63F 2300/204; H04R 5/02; H04R 5/04; H04S 7/302
USPC ...................... 381/303, 309, 310; 340/407.1
See application file for complete search history.

(56) References Cited

U.S. PATENT DOCUMENTS

| 10,238,964 | B2 * | 3/2019 | Komori | A63F 13/28 |
| 10,331,214 | B2 * | 6/2019 | Yamano | A63F 13/23 |
| 10,347,093 | B2 * | 7/2019 | Rihn | G06F 3/167 |
| 10,620,704 | B2 * | 4/2020 | Rand | G06F 3/016 |

(Continued)

*Primary Examiner* — Xu Mei
(74) *Attorney, Agent, or Firm* — Paratus Law Group, PLLC

(57) ABSTRACT

There is provided an information processing apparatus to provide an information processing apparatus, an information processing method, and a program capable of realizing pseudo sensory presentation with a higher degree of freedom by a combination of a tactile sense and an auditory sense. The information processing apparatus includes a control unit configured to perform a stimulus output control of controlling output of stimuli from a plurality of tactile stimulators, and a sound output control of controlling output of sound from a sound output unit, wherein the control unit performs the stimulus output control and the sound output control in a linked manner so that perception is made at a perceptual position indicated by predetermined position information.

10 Claims, 10 Drawing Sheets

(56) References Cited

U.S. PATENT DOCUMENTS

| | | | |
|---|---|---|---|
| 2012/0062491 A1* | 3/2012 | Coni | G06F 3/03547 |
| | | | 345/173 |
| 2013/0038603 A1* | 2/2013 | Bae | G06F 3/016 |
| | | | 345/419 |
| 2014/0292501 A1* | 10/2014 | Lim | G08B 6/00 |
| | | | 340/407.2 |
| 2015/0348378 A1* | 12/2015 | Obana | G06F 3/165 |
| | | | 700/94 |
| 2016/0007117 A1* | 1/2016 | Ohashi | H04S 7/302 |
| | | | 381/303 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/000983 (filed on Jan. 16, 2019) under 35 U.S.C. § 371, which claims priority to Japanese Patent Application No. 2018-040349 (filed on Mar. 7, 2018), which are all hereby incorporated by reference in their entirety.

FIELD

The present disclosure relates to an information processing apparatus, an information processing method, and a program.

BACKGROUND

Conventionally, for example, various technologies for presenting tactile stimuli such as vibration to a user have been proposed.

Patent Literature 1 discloses a speaker device for increasing a sound pressure while ensuring thinness by transmitting vibrations generated in an actuator to two diaphragms that are arranged opposite to each other with a vibration transmitting member interposed therebetween.

CITATION LIST

Patent Literature

Patent Literature 1: JP 2012-105021 A

SUMMARY

Technical Problem

In stimulus presentation using a tactile stimulus presentation device according to the related art, a stimulus presentation position is restricted by a position of a tactile stimulator (actuator), and it is difficult to provide sensory presentation with a higher degree of freedom.

Further, although Patent Literature 1 discloses a device having vibration and sound, it is intended to increase a sound pressure by using vibration, and improvement of sensory presentation is not considered.

In view of this, the present disclosure proposes an information processing apparatus, an information processing method, and a program capable of realizing pseudo sensory presentation with a higher degree of freedom by a combination of a tactile sense and an auditory sense.

Solution to Problem

According to the present disclosure, an information processing apparatus is provided that includes: a control unit configured to perform a stimulus output control of controlling output of stimuli from a plurality of tactile stimulators, and a sound output control of controlling output of sound from a sound output unit, wherein the control unit performs the stimulus output control and the sound output control in a linked manner so that perception is made at a perceptual position indicated by predetermined position information.

According to the present disclosure, an information processing method is provided that includes: performing, by a processor, a stimulus output control of controlling output of stimuli from a plurality of tactile stimulators, and a sound output control of controlling output of sound from a sound output unit; and performing, by the processor, the stimulus output control and the sound output control in a linked manner so that perception is made at a perceptual position indicated by predetermined position information.

According to the present disclosure, a program is provided that causes a computer to function as a control unit configured to perform a stimulus output control of controlling output of stimuli from a plurality of tactile stimulators, and a sound output control of controlling output of sound from a sound output unit, wherein the control unit performs the stimulus output control and the sound output control in a linked manner so that perception is made at a perceptual position indicated by predetermined position information.

Advantageous Effects of Invention

As described above, according to the present disclosure, it is possible to realize pseudo sensory presentation with a higher degree of freedom by a combination of a tactile sense and an auditory sense.

Note that the effects are not necessarily limited to those described above, and any effect shown in the present specification or other effects that can be grasped from the present specification may be exerted together with or in place of the above-described effects.

DESCRIPTION OF EMBODIMENTS

Figure 1:
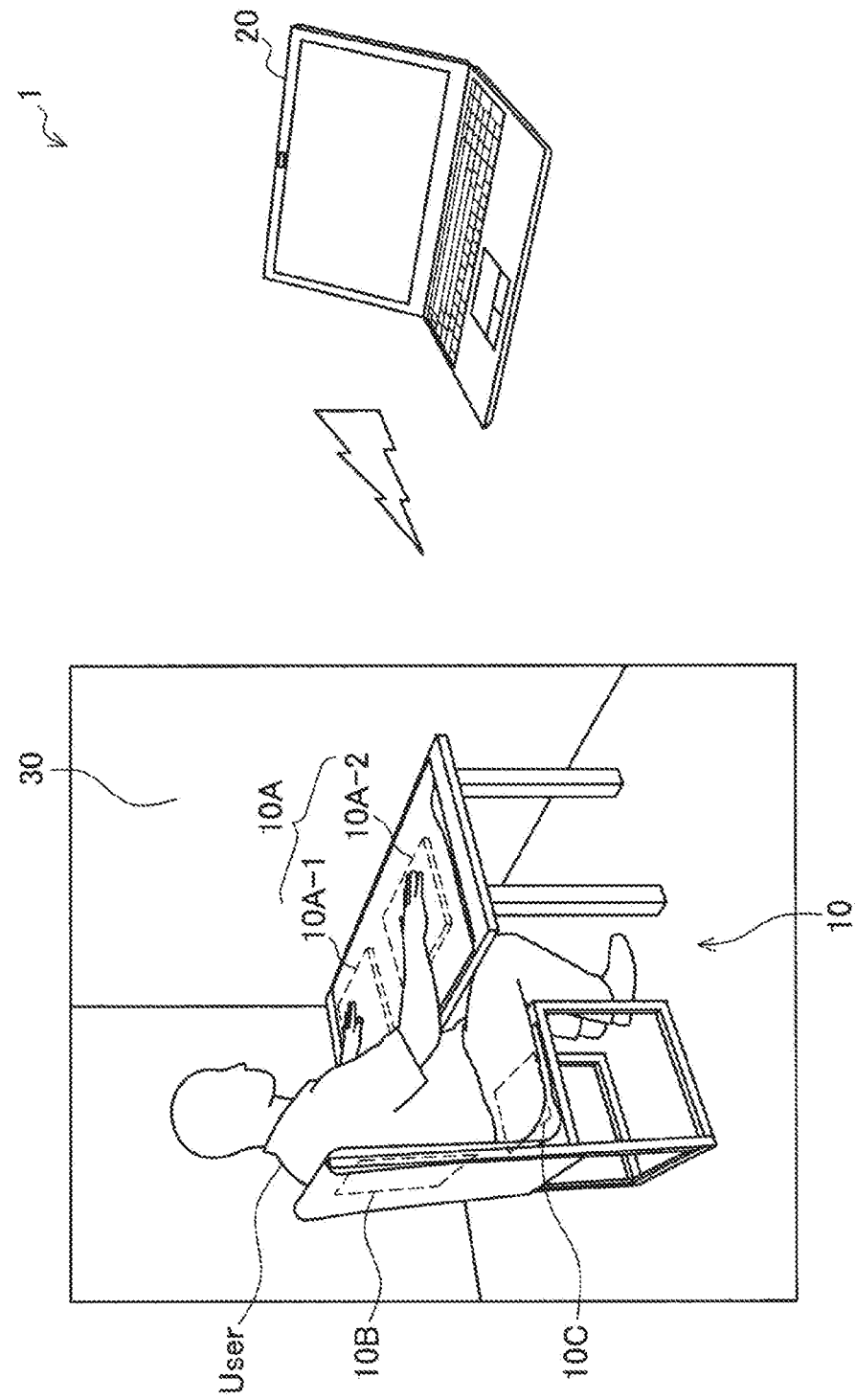
FIG. 1 is a diagram illustrating an overview of an information processing system according to an embodiment of the present disclosure.

Hereinafter, preferred embodiments of the present disclosure will be described in detail with reference to the accompanying drawings. Note that, in the present specification and the drawings, components having substantially the same functional configuration are denoted by the same reference numerals, and an overlapping description will be omitted.

Further, the description will be made in the following order.

1. Overview of Information Processing System According to Embodiment of Present Disclosure
2. Example of Configuration of Information Processing Apparatus 20
3. Operation Processing
4. Application Example
5. Summary

1. Overview of Information Processing System According to Embodiment of Present Disclosure FIG. 1 is a diagram illustrating an overview of an information processing system according to an embodiment of the present disclosure. As illustrated in FIG. 1, an information processing system 1 according to the present embodiment includes a tactile sense presentation device 10, an information processing apparatus 20, and an acoustic apparatus 30.

As illustrated in FIG. 1, examples of the tactile sense presentation device 10 include tactile sense presentation devices 10A placed on a desk on which hands of a user are placed, a tactile sense presentation device 10B installed on the back of a chair on which the user sits, and a tactile sense presentation device 10C installed on a seat of the chair. A stimulus presented by the tactile sense presentation device 10 is assumed to be vibration presented by using an actuator or the like, temperature presented by using a Peltier element or the like, or force presentation presented by using an electrical stimulus or the like. In the present embodiment, tactile sense presentation using vibration will be mainly described as an example. Further, the tactile sense presentation device 10 is not particularly limited in its installation place and shape as long as it is in contact with the body of the user. For example, the tactile sense presentation device 10 is not limited to being installed on a table or chair, but may be installed on a bed, floor, wall, or the like. Further, the tactile sense presentation device 10 is not limited to having a plate shape as illustrated in FIG. 1, but may be, for example, a controller (a gun-type controller or the like) gripped by the user for use, or clothing items worn by the user, such as outerwear, pants, socks, a belt, or gloves.

Figure 2:
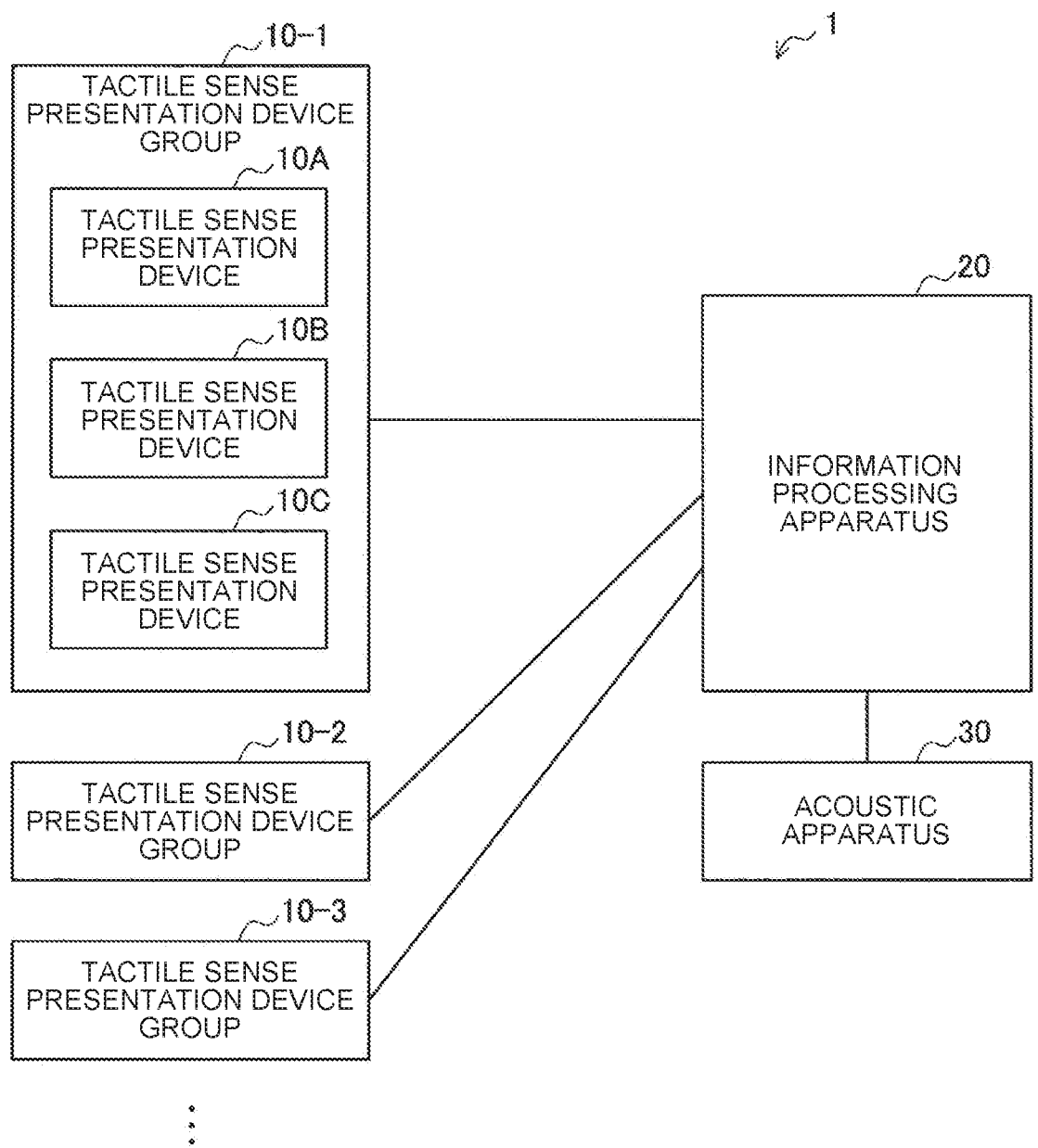
FIG. 2 is a diagram illustrating an example of an overall configuration of the information processing system according to the present embodiment.

Here, FIG. 2 illustrates an example of an overall configuration of the information processing system according to the present embodiment. As illustrated in FIG. 2, the information processing system 1 includes the tactile sense presentation device 10, the information processing apparatus 20, and the acoustic apparatus 30, and the information processing apparatus 20 is communicatively connected to the tactile sense presentation device 10 and the acoustic apparatus 30. A tactile sense presentation device group 10-1 includes a plurality of tactile sense presentation devices 10A, 10B, and 10C used by one user as illustrated in FIG. 1, and the information processing system 1 may be a system component including a plurality of tactile sense presentation device groups 10-1 to 10-3.

The tactile sense presentation device 10 includes a plurality of tactile stimulators (actuators) therein. When each of the plurality of tactile stimulators included in the tactile sense presentation device 10 generates vibration independently, the generated vibration can be perceived only in the peripheral portion of each tactile stimulator. That is, when the respective tactile stimulators are arranged to be spaced apart from each other, the vibrations generated by the tactile stimulators, respectively, can be perceived discretely in the body of the user.

Figure 3:
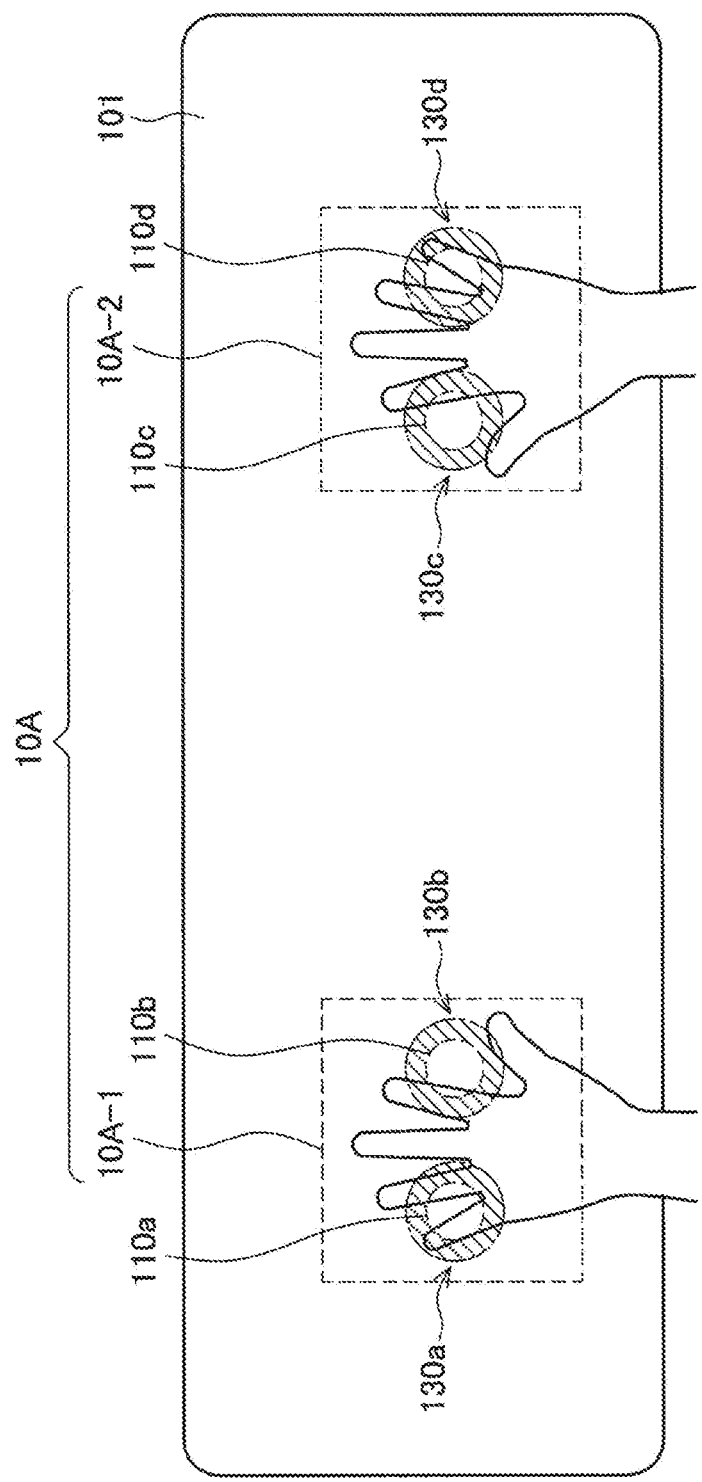
FIG. 3 is a diagram illustrating an example of a tactile sense presentation device according to the present embodiment.

Here, FIG. 3 illustrates an example of the tactile sense presentation device 10 according to the present embodiment. As illustrated in FIG. 3, for example, the tactile sense presentation devices 10A are installed on a table. In the example illustrated in FIG. 3, a tactile sense presentation device 10A-1 on which the left hand is placed and a tactile sense presentation device 10A-2 on which the right hand is placed are installed on a table, and both are covered by a table cover 101. The user puts the left palm on the tactile sense presentation device 10A-1 and puts the right palm on the tactile sense presentation device 10A-2.

Figure 4:
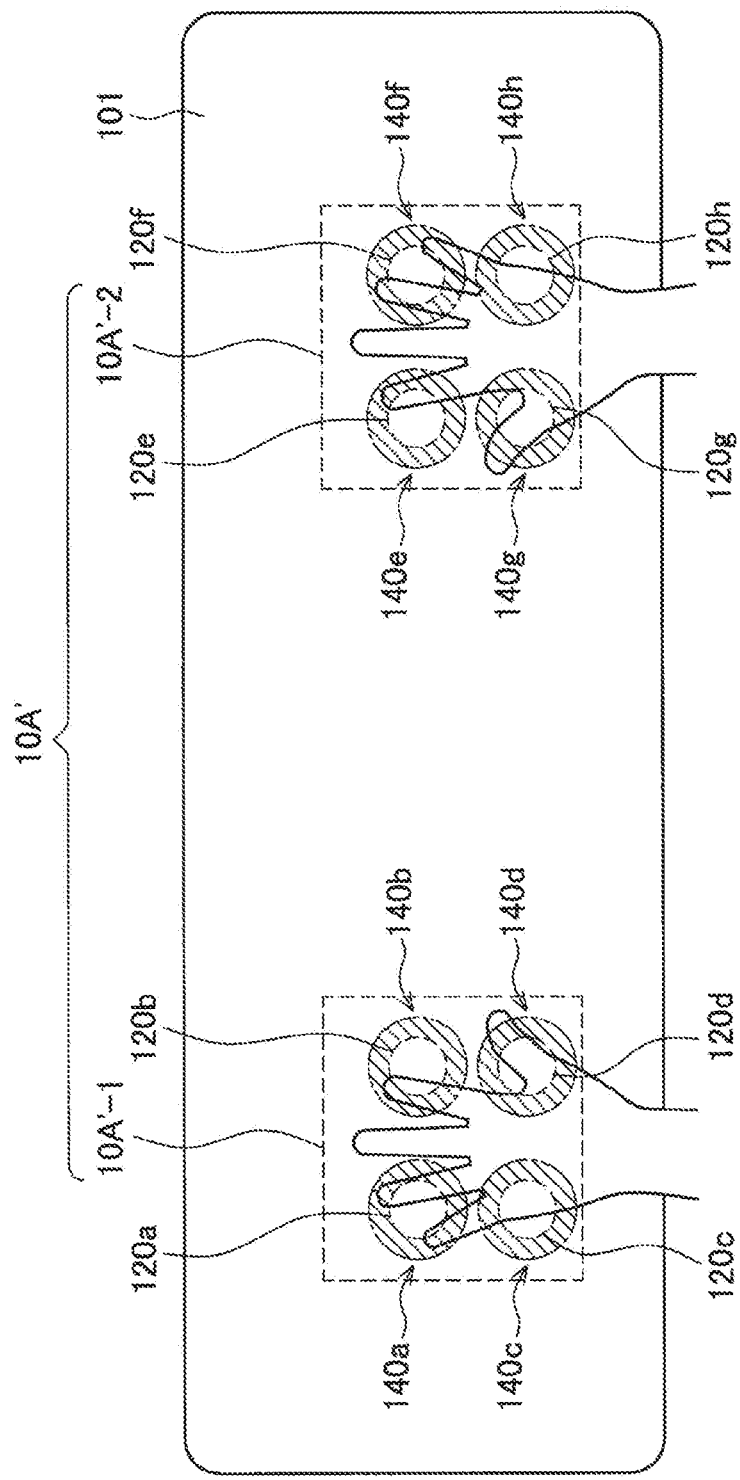
FIG. 4 is a diagram illustrating another example of the tactile sense presentation device according to the present embodiment.

Each tactile sense presentation device 10A includes a plurality of tactile stimulators 110 therein. Although arrangement of the plurality of tactile stimulators 110 is not particularly limited, for example, two tactile stimulators 110a and 110b, or 110b and 110c are arranged at intervals. Alternatively, as illustrated in FIG. 4, in each tactile sense presentation device 10A' (a tactile sense presentation device 10A'-1 and a tactile sense presentation device 10A'-2), for example, four tactile stimulators 120a to 120d, or 120e to 120h may be arranged at intervals.

Further, as described above, when each of the plurality of tactile stimulators 110 included in the tactile sense presentation device 10A generates vibration independently, the generated vibration can be perceived only in the peripheral portion 130 of each tactile stimulator 110. That is, when the respective tactile stimulators 110 are arranged to be spaced apart from each other, the vibrations generated by the tactile stimulators 110, respectively, can be perceived discretely in the body (for example, the palm) of the user.

Meanwhile, an illusion phenomenon called phantom sensation has been medically clarified. The phantom sensation is an illusion phenomenon in which humans perceive, when stimuli are simultaneously presented to different positions on the skin, only one of the stimuli at a position between positions where the stimuli are presented. For example, it has been known that when two tactile stimulators 110 arranged on the body of the user are caused to output stimuli simultaneously, a position (perceptual position) of the stimulation perceived by the user is usually between the two tactile stimulators 110.

Further, by changing the output intensity of the plurality of tactile stimulators, a range of a tactile stimulus that can be presented by the plurality of tactile stimulators 110 can be continuously expanded without changing the arrangement interval between the respective tactile stimulators 110. For example, an example of a relationship between the output intensity of each of two tactile stimulators 110 and a perceptual position (an example of the phantom sensation) will be described. For example, it is assumed that, with the passage of time, the output intensity of a first tactile stimulator 110 is continuously decreased, for example, from "1" to "0.6", and then to "0", and the output intensity of and a second tactile stimulator 110 is continuously increased from "0" to "0.6", and then to "1". In this case, the perceptual position perceived by the user can continuously move from a contact position of the first tactile stimulator 110 to a contact position of the second tactile stimulator 110.

The information processing apparatus 20 may be communicatively connected to the tactile sense presentation device 10 and the acoustic apparatus 30 in a wired or wireless manner, and may perform a stimulus output control in the tactile sense presentation device 10 and a sound output control in the acoustic apparatus 30.

The acoustic apparatus 30 outputs sound under the control of the information processing apparatus 20. In the example illustrated in FIG. 1, for example, a speaker array provided on a wall surface is assumed, and stereophonic sound can be presented. Note that the acoustic apparatus 30 is not limited to the example illustrated in FIG. 1, and, for example, may be provided in the tactile sense presentation device 10, or may be provided in a wearable device (such as headphones or a headset) or a portable device (for example, a portable music player, a smartphone, or a portable game machine). A stereophonic sound technology used by the acoustic apparatus 30 is not particularly limited, but may be, for example, a virtual phones technology (VPT) (registered trademark) or wave field synthesis.

Here, as described above, it is possible to move the perceptual position without changing the arrangement interval between the tactile stimulators by continuously changing the output intensity of each tactile stimulator based on the illusion phenomenon called phantom sensation. However, in this case, the perceptual position is limited to be "between" the plurality of tactile stimulators.

Therefore, in the present embodiment, a mechanism in which cross-modal perception is applied is presented. The mechanism realizes pseudo sensory presentation with a higher degree of freedom by a combination of a tactile sense and an auditory sense by utilizing the fact that a spatial resolution of a human sense is higher in the auditory sense than in the tactile sense.

Specifically, the information processing system 1 according to the present embodiment uses an illusion phenomenon called apparent motion by combining a tactile sense and an auditory sense, and thus is not limited by the arrangement of the plurality of tactile stimulators. Therefore, it is also possible to perform pseudo sensory presentation at a position other than between the plurality of tactile stimulators (that is, corresponding to a perceptual position other than between the plurality of tactile stimulators). In the present embodiment, the perceptual position means a predetermined position (two-dimensional or three-dimensional position) at which a person perceives a stimulus (here, a tactile or auditory stimulus).

The "apparent motion" is a phenomenon in which an object appears to move, even though no physical motion actually exists, and is generally known. Beta movement is a typical apparent motion. The beta movement is a phenomenon in which when a first stimulation target is momentarily presented to a certain place, and then a second stimulation target is momentarily presented to a slightly distant place from the certain place a little later, movement from the initial place to the next place can be felt. Such beta movement can also occur in the tactile sense or auditory sense.

In the present embodiment, the apparent motion represented by the beta movement is used to realize pseudo sensory presentation by combining a tactile sense and an auditory sense. For example, it is assumed that the user places both open hands on two tactile sense presentation devices 10A-1 and 10A-2 placed on a table as illustrated in FIG. 3, respectively. The information processing apparatus 20 performs the sound output control in which a predetermined sound source is sequentially passed from the left side of the user to the left hand of the user, to the right hand of the user, and then to the right side of the user by the stereophonic sound of the acoustic apparatus 30, and changes the intensity (output intensity) of the stimulus output from each of the tactile stimulators 110a to 110d provided in the tactile sense presentation device 10A-1 and the tactile sense presentation device 10A-2, thereby making it possible to realize the pseudo sensory presentation at a position between the tactile sense presentation device 10A-1 and the tactile sense presentation device 10A-2, or a position other than between the tactile sense presentation device 10A-1 and the tactile sense presentation device 10A-2 where the tactile stimulator 110 does not present a stimulus. The present embodiment can also be utilized for entertainment such as an interactive game.

Hereinabove, the information processing system according to the embodiment of the present disclosure has been described. Next, a specific configuration of the information processing apparatus 20 included in the information processing system according to the present embodiment will be described with reference to the drawings.

2. Example of Configuration of Information Processing Apparatus 20

Figure 5:
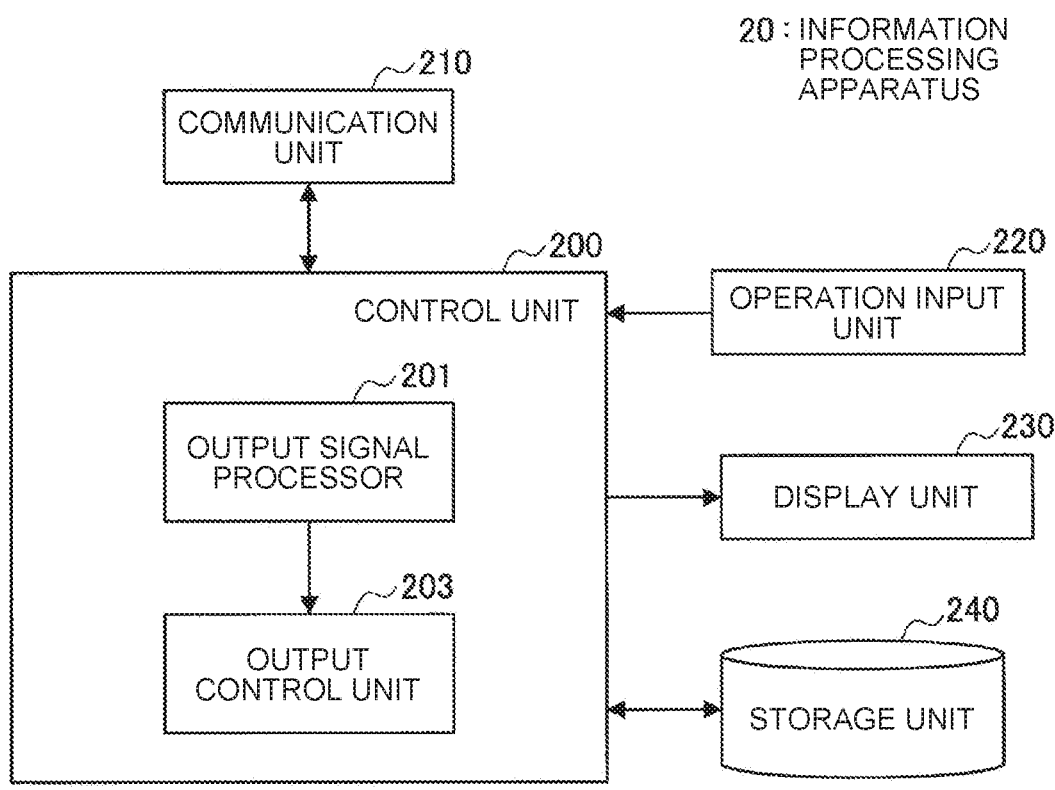
FIG. 5 is a block diagram illustrating an example of a configuration of an information processing apparatus according to the present embodiment.

FIG. 5 is a block diagram illustrating an example of a configuration of the information processing apparatus 20 according to the present embodiment. As illustrated in FIG. 5, the information processing apparatus 20 includes a control unit 200, a communication unit 210, an operation input unit 220, a display unit 230, and a storage unit 240.

(Control Unit 200)

The control unit 200 functions as an operation processing device and a control device, and controls an overall operation in the information processing apparatus 20 according to various programs. The control unit 200 is implemented by an electronic circuit such as a central processing unit (CPU) or a microprocessor. Further, the control unit 200 may include a read only memory (ROM) that stores a program to be used, an operation parameter, or the like, and a random access memory (RAM) that temporarily stores parameters that appropriately change.

Further, the control unit 200 according to the present embodiment also functions as an output signal processor 201 and an output control unit 203.

The output signal processor 201 generates or calibrates a signal (output signal; stereophonic sound signal and tactile sense presentation signal) output from the tactile sense presentation device 10 or the acoustic apparatus 30 based on a content acquired from a content server (not illustrated) or the storage unit 240. The output control unit 203 transmits the output signal processed by the output signal processor 201 to the tactile sense presentation device 10 (or each tactile stimulator 110) or the acoustic apparatus 30 through the communication unit 210, and performs a tactile sense presentation output for causing the user to perceive a stimulus (tactile stimulus or auditory stimulus) at a predetermined perceptual position, or a sound output control of positioning a sound source to the predetermined perceptual position.

More specifically, the output signal processor 201 determines (calculates), based on information (perceptual position information) on the perceptual position acquired from the content, the vibration intensity of a plurality of tactile stimulators 110 corresponding to the target perceptual position, and generates a tactile sense presentation signal to be output to the plurality of tactile stimulators 110. Further, the output signal processor 201 also generates a stereophonic sound signal that positions the sound source to the target perceptual position. Alternatively, the stereophonic sound signal and the tactile sense presentation signal corresponding to the target perceptual position may be generated in advance and the output signal processor 201 may acquire the stereoscopic sound signal and the tactile sense presentation signal from the content.

The perceptual position information may be two-dimensional or three-dimensional position information. Further, the perceptual position information may move on a target route (target movement route) with the passage of time. The output signal processor 201 generates or calibrates, based on target route information (perceptual position information) acquired from the content, the stereophonic sound signal and the tactile sense presentation signal so that the perceptual position moves along the target route with the passage of time (for example, at a predetermined speed specified in the content). Alternatively, the stereophonic sound signal and the tactile sense presentation signal corresponding to the target route specified as described above may be generated in advance and the output signal processor 201 may acquire the stereoscopic sound signal and the tactile sense presentation signal from the content. Here, the movement route of the perceptual position will be described with reference to FIGS. 6 to 7.

Figure 6:
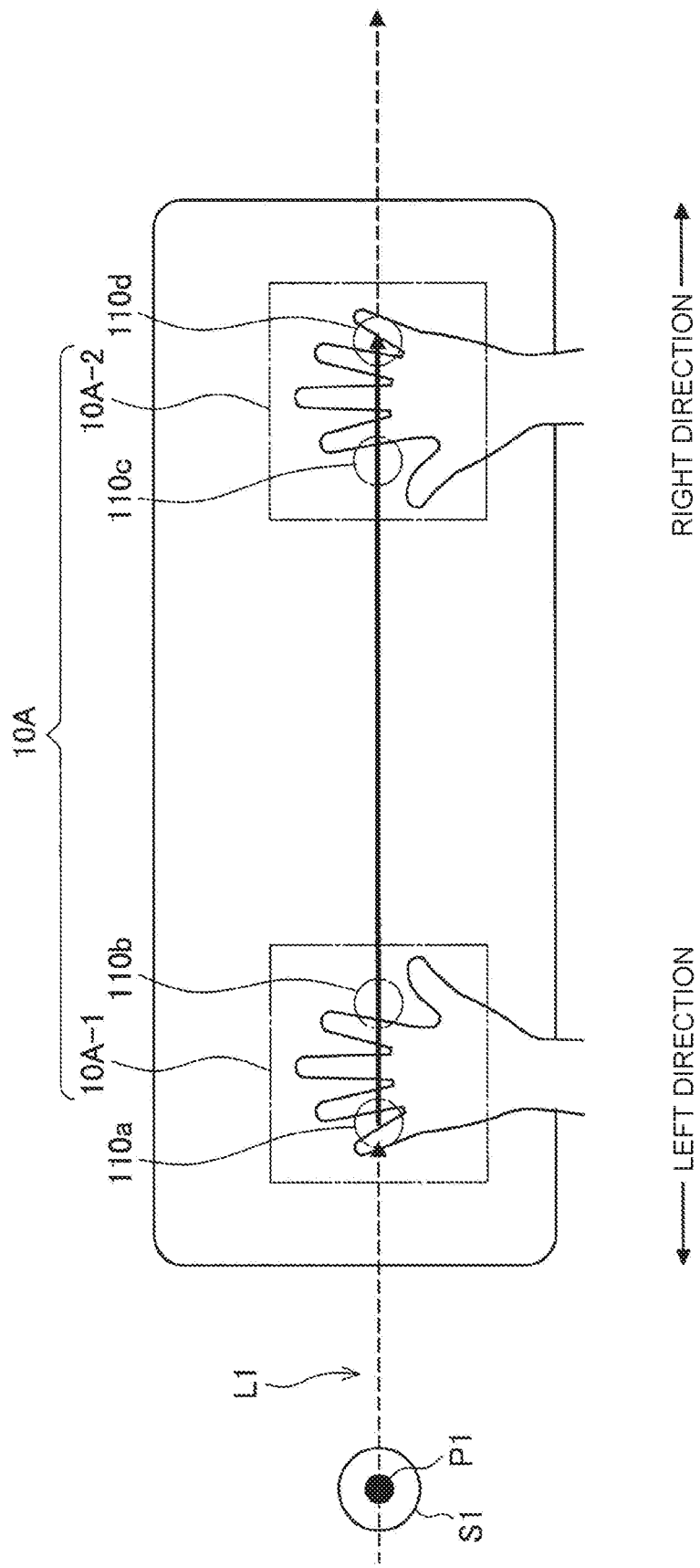
FIG. 6 is a diagram illustrating an example of a movement route of a perceptual position according to the present embodiment.

FIG. 6 is a diagram illustrating an example of the movement route of the perceptual position according to the present embodiment. As illustrated in FIG. 6, for example, a movement route L1 along which a perceptual position P1 passes through the tactile sense presentation device 10A-1 and the tactile sense presentation device 10A-2 from the left hand side of the user to the right hand side of the user is assumed. In the movement route L1 illustrated in FIG. 6, a solid line portion is between the two tactile sense presentation devices 10A-1 and 10A-2, and means a region for sensory presentation that can be realized by the plurality of tactile stimulators 110 provided in each tactile sense presentation device 10A, and a wavy line portion means a region for pseudo sensory presentation to which expansion can be made with a combination with stereophonic sound.

As described above, the movement route L1 includes a route connecting the plurality of tactile stimulators 110 and a route (a route positioned outside the plurality of tactile stimulators 110) other than the route connecting the plurality of tactile stimulators 110.

For example, as illustrated in FIG. 6, when the user places both open palms on the tactile sense presentation devices 10A-1 and 10A-2, it is possible to arbitrarily move a range (perceptual position) of tactile stimulation on the skin of each of both palms of the user by individually changing (controlling the output intensity) the output intensity of the plurality of tactile stimulators 110a and 110b of the tactile sense presentation device 10A-1 and the output intensity of the plurality of tactile stimulators 110c and 110d of the tactile sense presentation device 10A-2. The information processing apparatus 20 performs a stereophonic sound output control in which, for example, a sound source S1 is sequentially passed from the left side of the user to the left hand, to the right hand, and then to the right side of the user along the movement route L1 by the acoustic apparatus 30, and performs a tactile stimulation control in which a range of tactile stimulation is moved from the left to the right in the tactile sense presentation device 10A-1 and then a range of tactile stimulation is moved from the left to the right in the tactile sense presentation device 10A-2 a little later, based on the movement (that is, a moving speed of the perceptual position P1) of the sound source S1. Here, the example in which the sound source S1 is moved over the entire range of the movement route L1 has been described, but the present embodiment is not limited thereto, and the sound source S1 moves over a partial range of the movement route L1. For example, on the movement route L1, the sound source S1 may start movement from the left side of the user and may be moved to the left hand of the user. Further, on the movement route L1, the sound source S1 may start movement from the right hand of the user and may be moved toward the left side. Either of them can be set as acoustic information in advance in the content.

As a result, in the present embodiment, the tactile stimulation and the stereophonic sound can be combined to enable pseudo perception of the user that the stimulation target passes from the left hand to the right hand. At this time, no tactile sense presentation is provided between the tactile sense presentation device 10A-1 and the tactile sense presentation device 10A-2, or at a position other than between the tactile sense presentation devices 10A-1 and 10A-2, but the user can be caused to feel like any stimulation target moves, due to the apparent motion.

Figure 7:
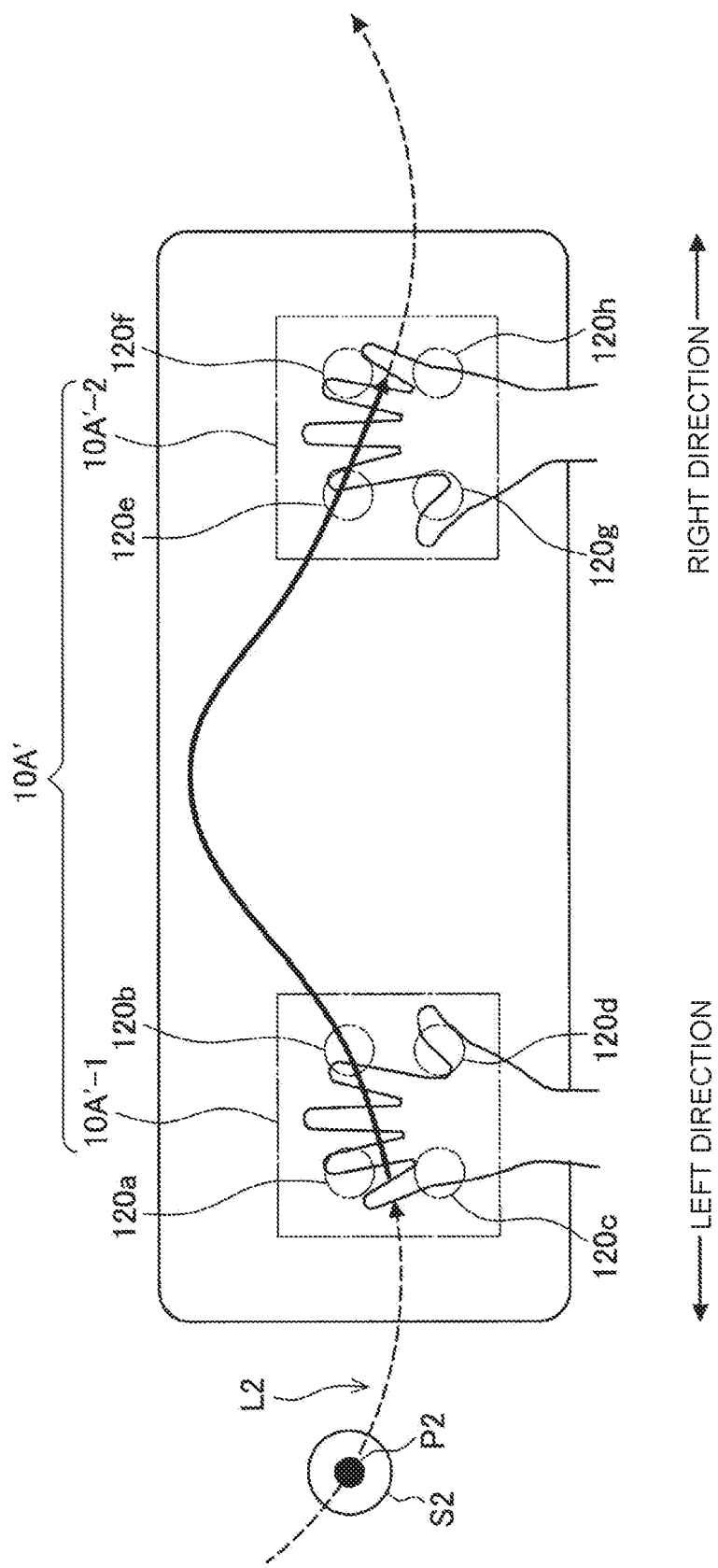
FIG. 7 is a diagram illustrating another example of the movement route of the perceptual position according to the present embodiment.

Note that the movement route L is not limited to a straight line as illustrated in FIG. 6, and may be a movement route L2 including a curved line as illustrated in FIG. 7. In an example illustrated in FIG. 7, it is preferable that the tactile sense presentation devices 10A' in which four tactile stimulators 120 are provided is used, because a perceptual position P2 diagonally moves in the tactile sense presentation device 10A'-1 and the tactile sense presentation device 10A'-2.

Hereinabove, the tactile sense presentation control and the stereophonic sound control according to the target route (target movement route L) have been described. Note that, in the above example, the tactile sense presentation devices 10A installed on the desk were described, but the present embodiment is not limited thereto. For example, as illustrated in FIG. 1, in a case where one user uses a plurality of tactile sense presentation devices 10 (for example, the tactile sense presentation devices 10A, the tactile sense presentation device 10B, and the tactile sense presentation device 10C), the movement route L may include a route that passes through the plurality of tactile sense presentation devices 10. Further, in a case where a plurality of users use the tactile sense presentation devices 10, respectively (for example, a user A uses the tactile sense presentation device group 10-1 and a user B uses the tactile sense presentation device group 10-2), the movement route L may include a route that passes through the tactile sense presentation devices 10 used by the plurality of users, respectively.

Further, when a timing of an event in which the sound source S starts movement and a timing of an event in which tactile sense presentation is provided are the same as each other, the output signal processor 201 can acquire (or predict) an arrival time of the sound source S to a tactile sense presentation target (user) in advance, and generate the tactile sense presentation signal. Hereinafter, a description will be provided with reference to FIGS. 8 and 9.

Figure 8:
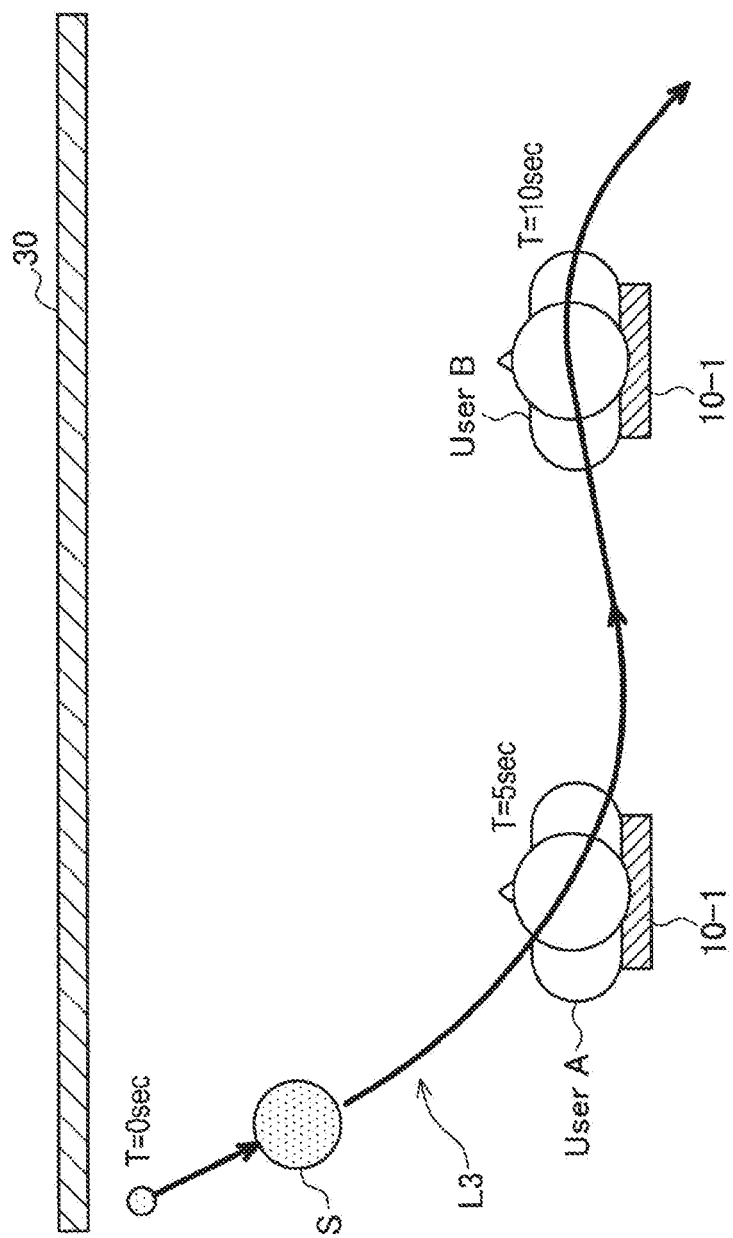
FIG. 8 is a diagram for describing an arrival time of a mobile sound source to a user according to the present embodiment.

FIG. 8 is a diagram for describing an arrival time of a mobile sound source to a user. As illustrated in FIG. 8, for example, in a case where positions of a plurality of users (user A and user B) with respect to the acoustic apparatus 30 (for example, a speaker array), a movement route L3, and a moving speed are acquired, arrival times T of a sound source S3 to the user A and the user B can be acquired. The movement route L3 and the moving speed can also be acquired as a route and a moving speed of the mobile sound source from the stereophonic sound signal included in the content. Further, the users illustrated in FIG. 3 use the tactile sense presentation device group 10-1 and the tactile sense presentation device group 10-2, respectively. As for the arrival time T, for example, as illustrated in FIG. 3, a start time T is 0 sec (T=0 sec), the arrival time T to the user A is 5 sec (T=5 sec), and the arrival time T to the user B is 10 sec (T=10 sec).

Figure 9:
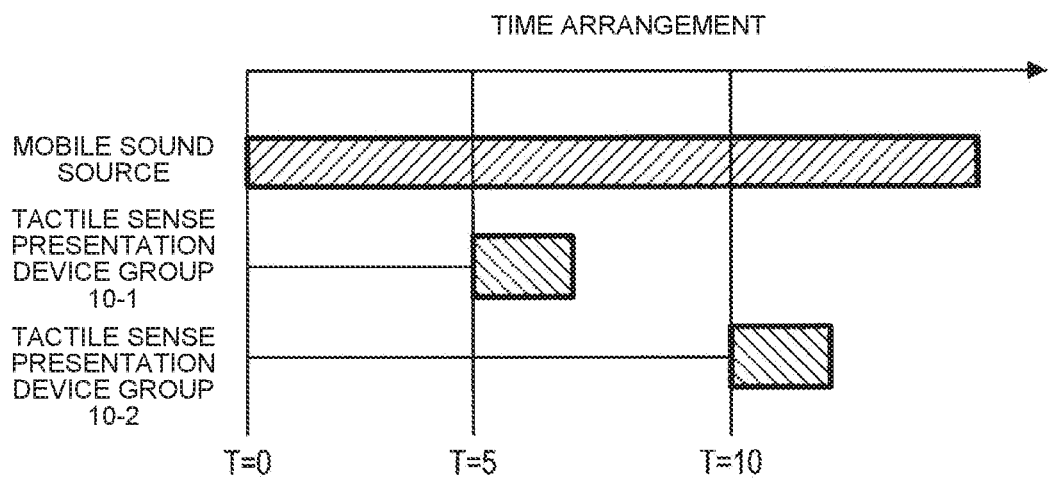
FIG. 9 is a diagram illustrating an example of a tactile sense presentation signal generated based on the arrival time of the mobile sound source to the user according to the present embodiment.

FIG. 9 is a diagram illustrating an example of a tactile sense presentation signal generated based on the arrival time of the sound source S3 to the user according to the present embodiment. As illustrated in FIG. 9, when a timing of an event in which the mobile sound source starts movement and a timing of an event in which tactile sense presentation is provided are the same as each other, the output signal processor 201 generates a tactile sense presentation signal in which a non-amplitude section is provided at the head of a tactile waveform to be reproduced according to the acquired arrival time T of the sound source S3 to each user. For example, a tactile sense presentation signal of the tactile sense presentation device group 10-1 that presents a tactile sense to the user A has a non-amplitude section from 0 sec to 5 sec. Further, a tactile sense presentation signal of the tactile sense presentation device group 10-2 that presents a tactile sense to the user B has a non-amplitude section from 0 sec to 10 sec. Note that the output signal processor 201 may gradually increase the output intensity according to the arrival time T of the sound source S3.

Further, the output signal processor 201 may delay an actual reproduction timing according to the arrival time T of the sound source S3.

Further, the output signal processor 201 can cope with a case where the speed of the sound source S3 changes on the way by generating the tactile sense presentation signal having an amplitude corresponding to the arrival time T.

As described above, in the present embodiment, the output signal processor 201 can automatically generate a tactile sense presentation signal for presenting a tactile sense at an appropriate timing based on user position information (position information of the user in the space may be automatically detected by a sensor, or may be set in advance), and a stereophonic sound signal (acoustic information of the mobile sound source in the three-dimensional space). As a result, it is possible to save the trouble of manually generating a tactile signal (measuring the timing of the amplitude) while actually reproducing and listening to the sound of the content.

Although the tactile signal generation when the perceptual position moves has been described above, the present embodiment is not limited thereto, and even in a case where the perceptual position is at a position other than between the tactile stimulators 110 and does not move, it is possible to enable pseudo perception of a position of a stimulation target other than between the tactile stimulators 110 by a combination with stereophonic sound and by controlling the output intensity of each tactile stimulator 110.

(Communication Unit 210)

The communication unit 210 transmits/receives information to/from other devices. For example, the communication unit 210 transmits a control signal for output of a tactile stimulus to each of the plurality of tactile stimulators 110 (or the tactile sense presentation device 10) under the control of the output control unit 203.

The communication unit 210 is communicatively connected to another device through, for example, a wired/wireless local area network (LAN), Wi-Fi (registered trademark), Bluetooth (registered trademark), short-range wireless communication, or a mobile communication network (long term evolution (LTE) or 3rd generation mobile communication system (3G)).

(Operation Input Unit 220)

The operation input unit 220 receives an operation instruction from the user and outputs an operation content thereof to the control unit 200. The operation input unit 220 may be a touch sensor, a pressure sensor, or a proximity sensor. Alternatively, the operation input unit 220 may be a physical component such as a keyboard, a mouse, a button, a switch, and a lever.

(Display Unit 230)

The display unit 230 is a display device that outputs various display screens. For example, the display unit 230 may display the perceptual position information (including the movement route) and the generated tactile sense presentation signal. The display unit 230 may be, for example, a display device such as a liquid crystal display (LCD) or an organic electroluminescence (EL) display.

(Storage Unit 240)

The storage unit 240 is implemented by a read only memory (ROM) that stores a program to be used for processing performed by the control unit 200, an operation parameter, or the like, and a random access memory (RAM) that temporarily stores parameters that appropriately change.

Hereinabove, the configuration of the information processing apparatus 20 according to the present embodiment has been described in detail. Note that the configuration of the information processing apparatus 20 is not limited to the example illustrated in FIG. 5. For example, the information processing apparatus 20 may include a plurality of devices. Further, the information processing apparatus 20 may further include a sound input unit and a sound output unit. Further, the information processing apparatus 20 may further include a sensor unit (a camera, a depth camera, and the like).

Further, the information processing apparatus 20 is not limited to a personal computer (PC) illustrated in FIG. 1, and may be implemented by a smartphone, a mobile phone terminal, a tablet terminal, a dedicated terminal, or the like. Further, at least a part of the control unit 200 of the information processing apparatus 20 may be implemented by a server on the network.

3. Operation Processing

Figure 10:
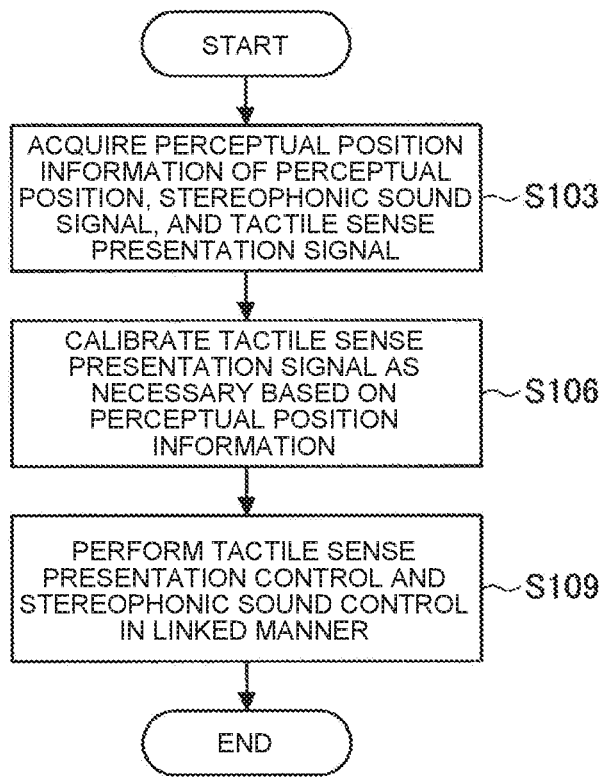
FIG. 10 is a flowchart illustrating an example of a flow of output control processing according to the present embodiment.

Next, operation processing of the information processing system according to the present embodiment will be described in detail with reference to FIG. 10. FIG. 10 is a flowchart illustrating an example of a flow of output control processing according to the present embodiment.

As illustrated in FIG. 10, first, the information processing apparatus 20 acquires, from a content server or the like, perceptual position information, a stereophonic sound signal, and tactile sense presentation vibration (Step S103). The perceptual position information may be included in the stereophonic sound signal.

Next, the information processing apparatus 20 calibrates the tactile sense presentation signal as necessary based on the perceptual position information (Step S106). For example, the information processing apparatus 20 may calculate the stimulation intensity of each tactile stimulator 110 that is a target of the tactile sense presentation control based on perceptual position movement route information included in the perceptual position information, and calibrate the tactile sense presentation signal. Further, the information processing apparatus 20 may detect the presence or absence of the user based on a detection result obtained by a camera or a pressure sensor to prevent output of the tactile sense presentation signal to a place where the user is absent. For example, in a situation where a plurality of tactile sense presentation devices 10 are mounted on seats, respectively, in advance, the information processing apparatus 20 checks whether or not a user is seated based on sensing data, and the tactile sense presentation signal may not be output to the tactile sense presentation device 10 for a seat where a user is absent.

Then, the information processing apparatus 20 outputs the generated tactile sense presentation signal to the tactile sense presentation device 10 to perform the tactile sense presentation control, and outputs a stereophonic sound signal to the acoustic apparatus 30 to perform the stereophonic sound output control with the tactile sense presentation control in a linked manner (Step S109).

Hereinabove, an example of the operation processing according to the present embodiment has been described. Note that the operation processing illustrated in FIG. 10 is an example, and the present disclosure is not limited to the example illustrated in FIG. 10.

4. Application Example

Figure 11:
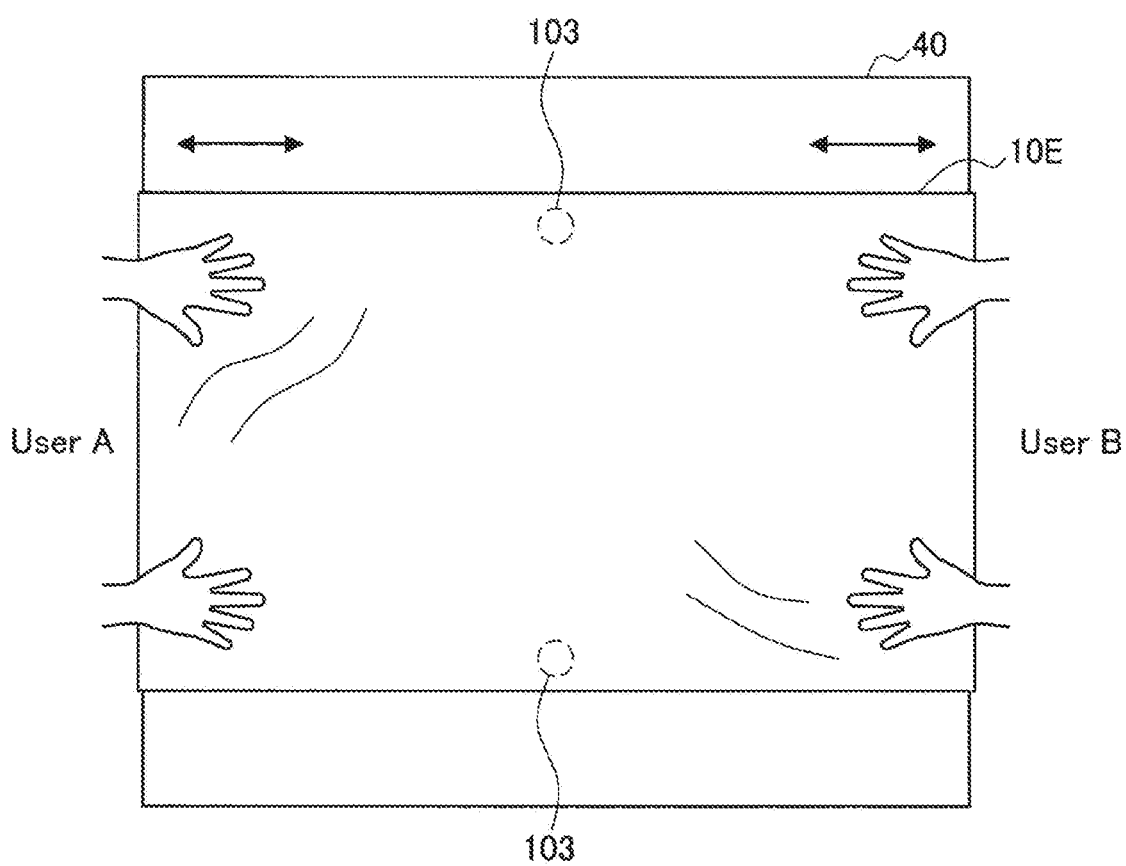
FIG. 11 is a diagram illustrating an example of pseudo sensory presentation according to an application example of the present embodiment.

Next, an application example of the tactile sense presentation device 10 according to the present embodiment will be described with reference to FIG. 11. As illustrated in FIG. 11, for example, a table cloth installed on a table 40 can be used as a tactile sense presentation device 10E.

The tactile sense presentation device 10E is implemented by a structure in which the table cloth is fixed to the table 40 at, for example, two fixed positions 103 in a state where the table cloth is hung on the table 40. The table cloth has elasticity. The tactile sense presentation device 10E further includes a structure in which both ends (an end portion on a user A side and an end portion on a user B side) of the table cloth are held by a predetermined mechanism at the back side of the table 40 in a state where the table cloth is pulled horizontally (a direction toward the user A side and the user B side) with respect to the table 40. Note that it is preferable that a pattern design of the table cloth does not seem uncomfortable when expanded or contracted. Further, in a case where the table cloth is installed at each seating position of the user on one table 40, it is preferable that adjacent table cloths have a pattern that prevents misalignment from being noticed.

Then, the information processing apparatus 20 changes tension of the table cloth by controlling the mechanism that holds the table cloth at the back side of the table 40. In other words, as the table cloth is loosened or pulled, tactile stimuli are presented to the palms of both hands of the user placed on the table cloth, and a feeling like the hand is pulled can be present in a natural state without any discomfort. In this way, it is possible to produce a feeling like something pulls the hand even when there is nothing, and it is possible to utilize it for entertainment such as an interactive game.

Further, it is possible to further enhance the effect by combining the above-described stereophonic sound or tactile stimulation (vibration presentation) with the sensory presentation using a table cloth as described above.

5. Summary

As described above, with the information processing system according to the embodiment of the present disclosure, it is possible to realize pseudo sensory presentation with a higher degree of freedom by a combination of a tactile sense and an auditory sense.

Hereinabove, the preferred embodiment of the present disclosure has been described in detail with reference to the accompanying drawings, but the present technology is not limited to such examples. It is apparent that a person having ordinary knowledge in the technical field of the present disclosure can come up with various changes or modifications within the scope of the technical idea described in the claims, and it is naturally understood that the changes or modifications are also within the technical scope of the present disclosure.

For example, it is also possible to create a computer program for causing the hardware such as the CPU, the ROM, and the RAM embedded in the tactile sense presentation device 10, the information processing apparatus 20, or the acoustic apparatus 30 described above to implement the functions of the tactile sense presentation device 10, the information processing apparatus 20, or the acoustic apparatus 30. Further, a computer-readable storage medium that stores the computer program is also provided.

Further, the effects described in the present specification are merely illustrative or exemplary, and are not restrictive. That is, the technology according to the present disclosure can exhibit other effects that are obvious to those skilled in the art from the description in the present specification, in addition to or instead of the above effects.

Note that the present technology may also have the following configurations.

(1)

An information processing apparatus comprising:
a control unit configured to perform a stimulus output control of controlling output of stimuli from a plurality of tactile stimulators, and a sound output control of controlling output of sound from a sound output unit,
wherein the control unit performs the stimulus output control and the sound output control in a linked manner so that perception is made at a perceptual position indicated by predetermined position information.

(2)

The information processing apparatus according to (1), wherein the predetermined position information moves on a target route with passage of time.

(3)

The information processing apparatus according to (1) or (2), wherein the predetermined position information is positioned at a position outside a route connecting the plurality of tactile stimulators.

(4)

The information processing apparatus according to (2), wherein
the target route partially includes a route connecting the plurality of tactile stimulators, and
the control unit performs, in a linked manner, a control of controlling an output intensity of each tactile stimulator based on the position information that moves on the target route with passage of time, and a stereophonic sound control from the sound output unit.

(5)

The information processing apparatus according to (4), wherein the control unit performs
a control of moving a sound source by the stereophonic sound control according to the movement of the position information, and
controls the output intensity of each tactile stimulator according to an arrival time of the sound source.

(6)

The information processing apparatus according to (4) or (5), wherein the target route includes a straight line or a curved line.

(7)

The information processing apparatus according to any one of (4) to (6), wherein the control unit controls the output intensity of each tactile stimulator that comes into contact with a body of a user, according to an arrival time of a mobile sound source to a position of the user based on position information of the user.

(8)

The information processing apparatus according to (7), wherein the control unit controls the output intensity of each tactile stimulator that comes into contact with a body of each user according to an arrival time of the mobile sound source to a position of each of a plurality of users, based on position information of the plurality of users.

(9)

An information processing method comprising:

performing, by a processor, a stimulus output control of controlling output of stimuli from a plurality of tactile stimulators, and a sound output control of controlling output of sound from a sound output unit; and performing, by the processor, the stimulus output control and the sound output control in a linked manner so that perception is made at a perceptual position indicated by predetermined position information.

(10)

A program that causes a computer to function as a control unit configured to perform a stimulus output control of controlling output of stimuli from a plurality of tactile stimulators, and a sound output control of controlling output of sound from a sound output unit, wherein the control unit performs the stimulus output control and the sound output control in a linked manner so that perception is made at a perceptual position indicated by predetermined position information.

REFERENCE SIGNS LIST

1 INFORMATION PROCESSING SYSTEM
10, 10A (10A-1, 10A-2), 10A' (10A'-1, 10A'-2), 10B, 10C, 10E TACTILE SENSE PRESENTATION DEVICE
10-1 to 10-3 TACTILE SENSE PRESENTATION DEVICE GROUP
110 (110a to 110d) TACTILE STIMULATOR
120 (120a to 120h) TACTILE STIMULATOR
20 INFORMATION PROCESSING APPARATUS
200 CONTROL UNIT
201 OUTPUT SIGNAL PROCESSOR
203 OUTPUT CONTROL UNIT
210 COMMUNICATION UNIT
220 OPERATION INPUT UNIT
230 DISPLAY UNIT
240 STORAGE UNIT
30 ACOUSTIC APPARATUS

The invention claimed is:

1. An information processing apparatus comprising:
a control unit configured to
perform a stimulus output control of controlling output of stimuli from a plurality of tactile stimulators, and
perform a sound output control of controlling output of sound from a sound output unit,
wherein the control unit performs the stimulus output control and the sound output control in a linked manner so that perception is made at a perceptual position indicated by predetermined position information,
wherein the linked manner includes a delay of the stimulus output control according to an arrival time related to the sound output control, and
wherein the control unit is implemented via at least one processor.

2. The information processing apparatus according to claim 1, wherein the predetermined position information moves on a target route with passage of time.

3. The information processing apparatus according to claim 1, wherein the predetermined position information is positioned at a position outside a route connecting the plurality of tactile stimulators.

4. The information processing apparatus according to claim 2, wherein
the target route partially includes a route connecting the plurality of tactile stimulators, and
the control unit performs, in a linked manner, a control of controlling an output intensity of each tactile stimulator based on the position information that moves on the target route with passage of time, and a stereophonic sound control from the sound output unit.

5. The information processing apparatus according to claim 4, wherein the control unit performs
a control of moving a sound source by the stereophonic sound control according to the movement of the position information, and
controls the output intensity of each tactile stimulator according to an arrival time of the sound source.

6. The information processing apparatus according to claim 4, wherein the target route includes a straight line or a curved line.

7. The information processing apparatus according to claim 4, wherein
the control unit controls the output intensity of each tactile stimulator that comes into contact with a body of a user, according to an arrival time of a mobile sound source to a position of the user based on position information of the user.

8. The information processing apparatus according to claim 7, wherein
the control unit controls the output intensity of each tactile stimulator that comes into contact with a body of each user
according to an arrival time of the mobile sound source to a position of each of a plurality of users, based on position information of the plurality of users.

9. An information processing method comprising:
performing, by a processor, a stimulus output control of controlling output of stimuli from a plurality of tactile stimulators, and a sound output control of controlling output of sound from a sound output unit; and
performing, by the processor, the stimulus output control and the sound output control in a linked manner so that perception is made at a perceptual position indicated by predetermined position information,
wherein the linked manner includes a delay of the stimulus output control according to an arrival time related to the sound output control.

10. A non-transitory computer-readable storage medium having embodied thereon a program, which when executed by a computer causes the computer to execute a method, the method comprising:

performing a stimulus output control of controlling output of stimuli from a plurality of tactile stimulators; and performing a sound output control of controlling output of sound from a sound output unit, wherein the stimulus output control and the sound output control are performed in a linked manner so that perception is made at a perceptual position indicated by predetermined position information, wherein the linked manner includes a delay of the stimulus output control according to an arrival time related to the sound output control.

* * * * *